(12) United States Patent
Natsui et al.

(10) Patent No.: US 11,912,420 B2
(45) Date of Patent: Feb. 27, 2024

(54) DEICING SYSTEMS AND METHODS FOR AN AIRCRAFT

(71) Applicant: THE BOEING COMPANY, Chicago, IL (US)

(72) Inventors: Edward Charles Natsui, Renton, WA (US); Melissa Marie Bravin, Seattle, WA (US); Erik Marc Langhofer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/717,202

(22) Filed: Apr. 11, 2022

(65) Prior Publication Data

US 2023/0322393 A1    Oct. 12, 2023

(51) Int. Cl.
*B64D 15/22* (2006.01)
*B64D 43/00* (2006.01)

(52) U.S. Cl.
CPC ............. *B64D 15/22* (2013.01); *B64D 43/00* (2013.01)

(58) Field of Classification Search
CPC ......... B64D 15/12; B64D 15/20; B64D 15/22
See application file for complete search history.

(56) References Cited

U.S. PATENT DOCUMENTS

| | | | | |
|---|---|---|---|---|
| 7,643,941 B2* | 1/2010 | Lilie | .................. | G01W 1/02 702/50 |
| 8,711,008 B2* | 4/2014 | Cook | .................. | G01K 13/02 340/963 |
| 9,201,031 B2* | 12/2015 | Lilie | .................. | B64D 15/20 |
| 9,242,735 B1* | 1/2016 | Meis | .................. | B64D 15/20 |
| 10,737,793 B2* | 8/2020 | Meis | .................. | B64D 15/22 |
| 11,053,011 B2* | 7/2021 | Meis | .................. | B64D 15/12 |
| 2005/0218268 A1 | 10/2005 | Otto | | |
| 2013/0175397 A1* | 7/2013 | Meis | .................. | B64D 15/22 244/134 F |
| 2014/0007654 A1 | 1/2014 | Lilie | | |
| 2014/0184789 A1* | 7/2014 | Meis | .................. | G01N 1/2214 348/135 |

(Continued)

OTHER PUBLICATIONS

Extended European Search Report for EP 23164644.9-1004, dated Sep. 8, 2023.

*Primary Examiner* — Joshua J Michener
*Assistant Examiner* — Michael B. Kreiner
(74) *Attorney, Agent, or Firm* — Joseph M. Butscher; The Small Patent Law Group LLC (57) ABSTRACT

A system and method include a first icing detector configured to detect a first icing condition in relation to one or more portions of an aircraft. The first icing detector is configured to output a first icing signal indicative of the first icing condition. A second icing detector is configured to detect a second icing condition in relation to the one or more portions of the aircraft. The second icing detector is configured to output a second icing signal indicative of the second icing condition. A control unit is in communication with the first icing detector and the second icing detector. The control unit is configured to receive the first icing signal from the first icing detector and the second icing signal from the second icing detector. The control unit is further configured to distinguish between presence of supercooled liquid water and ice crystal icing in response to receiving one or both of the first icing signal or the second icing signal.

24 Claims, 4 Drawing Sheets

(56) References Cited

U.S. PATENT DOCUMENTS

2015/0344137 A1* 12/2015 Bartz .................... G01P 13/025
                                                          219/494
2017/0166314 A1*  6/2017 Meis ...................... B64D 15/20
2017/0370960 A1  12/2017 Benning
2019/0039742 A1   2/2019 Gordon

* cited by examiner

DEICING SYSTEMS AND METHODS FOR AN AIRCRAFT

FIELD OF THE DISCLOSURE

Examples of the present disclosure generally relate to systems and methods for deicing portions of an aircraft.

BACKGROUND OF THE DISCLOSURE

Aircraft are used to transport passengers and cargo between various locations. Various aircraft include icing detectors that are used to determine icing conditions on various portions of the aircraft, such as portions of an engine, wings, and the like. In response to detection of icing conditions, ice protection systems are activated to remove or otherwise reduce the ice on the portions of the aircraft.

Certain regulations, such as promulgated by the United States Federal Aviation Administration (FAA), define atmospheric envelopes in which icing conditions are considered for aircraft design and certification. Accumulation of ice on certain surfaces, such as aircraft wings and engine inlets, may affect performance of the aircraft. Icing conditions can exist in different forms, such as supercooled liquid water, ice crystals, or a mixture of the two.

Ice accumulation on a leading edge of a wing can impact lift and drag characteristics, while ice accumulation on an engine inlet or ingestion of ice crystals into the engine can reduce thrust. Additionally, ice accretion on air data probes can cause erroneous air data measurements. As such, real-time detection of icing conditions is used to ensure safe and efficient operation of an aircraft.

The distinct icing types have different and unique effects on an aircraft, which can pose a risk to transport category commercial aircraft at all temperatures and conditions within FAA icing regulations, for example but not limited to, 14 CFR Part 25, Appendix C, O and 14 CFR Part 33 Appendix D icing envelopes. Known aircraft typically use an ice accretion sensor that includes a probe designed to collect supercooled water droplets on the probe surface. However, the probe is typically unable to detect ice crystals within the Appendix D icing envelope.

SUMMARY OF THE DISCLOSURE

A need exists for an icing detection system and method that is able to distinguish between different types of icing conditions, such as supercooled water and ice crystals. Further, a need exists for a system and a method for detecting aircraft icing in various forms, and operating deicers in response thereto.

With those needs in mind, certain examples of the present disclosure provide a system including a first icing detector configured to detect a first icing condition in relation to one or more portions of an aircraft. The first icing detector is configured to output a first icing signal indicative of the first icing condition. A second icing detector is configured to detect a second icing condition in relation to the one or more portions of the aircraft. The second icing detector is configured to output a second icing signal indicative of the second icing condition. A control unit is in communication with the first icing detector and the second icing detector. The control unit is configured to receive the first icing signal from the first icing detector and the second icing signal from the second icing detector. The control unit is further configured to distinguish between presence of supercooled liquid water and ice crystal icing in response to receiving one or both of the first icing signal or the second icing signal.

In at least one example, the first icing detector is an icing conditions detector configured to detect both ice water content and liquid water content, and the second icing detector is a magnetostrictive ice detector configured to detect the liquid water content. In at least one further example, the icing conditions detector is unable to differentiate between the ice water content and the liquid water content, and the magnetostrictive ice detector is unable to detect the ice water content.

In at least one example, the system also includes one or more deicers in communication with the control unit. The one or more deicers are configured to deice the one or more portions of the aircraft. In at least one further example, the control unit is further configured to automatically operate the one or more deicers in response to receiving one or both of the first icing signal or the second icing signal. In at least one example, the one or more deicers include a first deicer configured to deice a first portion of the aircraft, and a second deicer configured to deice a second portion of the aircraft. As an example, the first portion of the aircraft includes one or more portions of an engine or a wing, and the second portion of the aircraft includes one or more portion of the other of the engine or the wing.

The system can also include a user interface having one or both of a display or a speaker. The control unit can be further configured to, based on the icing conditions, one or both of show information on the display or broadcast the information from the speaker.

In at least one example, the control unit is configured to determine the presence of the supercooled liquid water and potentially the ice crystal icing in response to receiving both the first icing signal and the second icing signal.

In at least one example, the control unit is configured to determine the presence of the ice crystal icing in response to receiving the first icing signal but not the second icing signal.

In at least one example, the control unit is configured to determine an error condition in response to receiving the second icing signal but not the first icing signal.

Certain examples of the present disclosure provide a method including communicatively coupling a control unit with a first icing detector, wherein the first icing detector is configured to detect a first icing condition in relation to one or more portions of an aircraft, and wherein the first icing detector is configured to output a first icing signal indicative of the first icing condition; communicatively coupling the control unit with a second icing detector, wherein the second icing detector is configured to detect a second icing condition in relation to the one or more portions of the aircraft, wherein the second icing detector is configured to output a second icing signal indicative of the second icing condition; receiving, by the control unit, one or both of the first icing signal from the first icing detector and the second icing signal from the second icing detector; and distinguishing, by the control unit, between presence of supercooled liquid water and ice crystal icing in response to receiving one or both of the first icing signal or the second icing signal.

Certain examples of the present disclosure provide an aircraft including a system for distinguishing icing conditions as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for detecting aircraft icing, in various forms, and distinguishing between different icing conditions. The systems and methods include first and second icing detectors in communication with a control unit, which is configured to differentiate between supercooled liquid water and ice crystal icing conditions. The control unit is further configured to output signals to airframe and engine ice protection systems.

In contrast to known ice detection systems, examples of the present disclosure are configured to identify and differentiate between both glaciated ice crystals and supercooled liquid water, and thereby provide a health check for an aircraft, including various systems, engines, and the like. Further, the systems and methods described herein are able to detect different phases of water. As such, examples of the present disclosure are independent of drop size or temperature, and can therefore function in any icing conditions (for example, Appendix C, Appendix O, or Appendix D).

Also, the systems and methods described herein increase flight deck crew situational awareness, in contrast to known systems, which rely on memory items and checklists. Additionally, the systems and methods described herein lead to reduced power and/or fuel consumption due to optimized activation of the ice protection systems.

Figure 1:
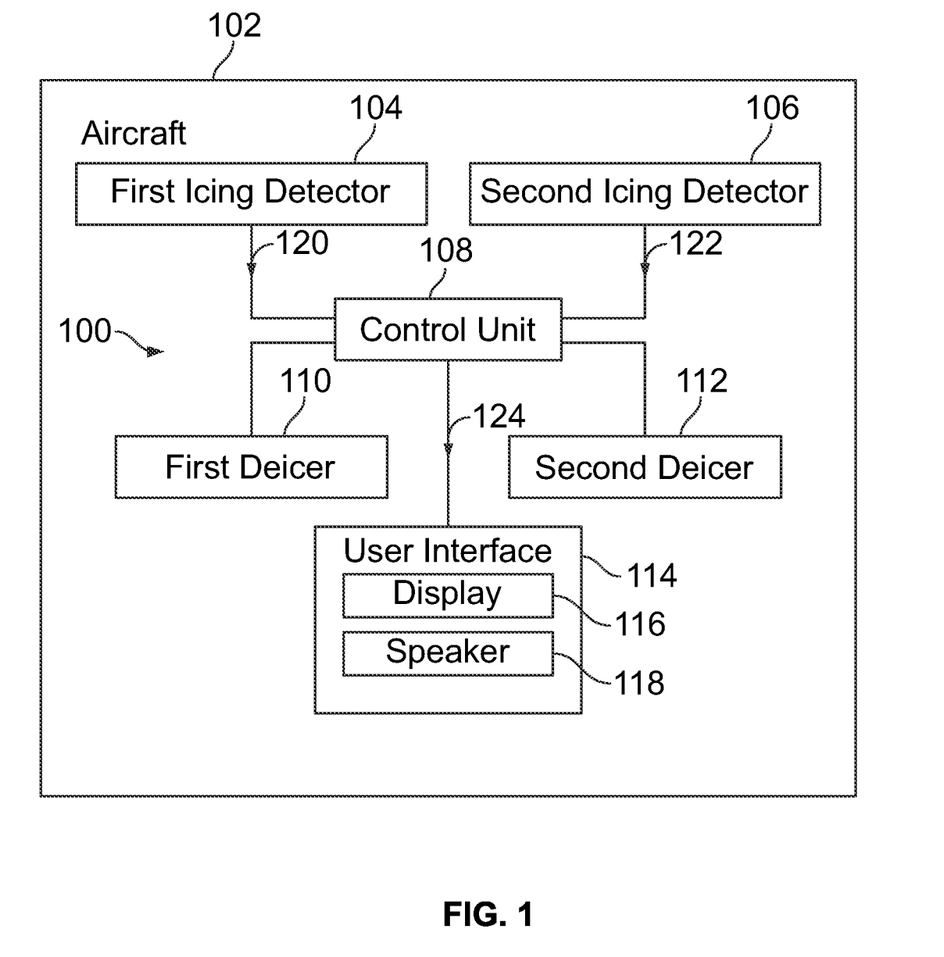
FIG. 1 illustrates a schematic block diagram of a system for deicing one or more portions of an aircraft, according to an example of the present disclosure.

FIG. 1 illustrates a schematic block diagram of a system 100 for deicing one or more portions of an aircraft 102, according to an example of the present disclosure. The system 100 includes a first icing detector 104 and a second icing detector 106. A control unit 108 is in communication with the first icing detector 104 and the second icing detector 106, such as through one or more wired or wireless connections. The control unit 108 is further in communication with a first deicer 110 and a second deicer 112, such as through one or more wired or wireless connections. In at least one example, the control unit 108 is also in communication with a user interface 114, such as can be part of a computer workstation, a flight deck computer, or the like. For example, the user interface 114 can be located in a cockpit or flight deck of the aircraft 102.

The deicers 110 and 112 can be any types of devices, systems, or the like configured to deice portions of an aircraft. Examples of the deicers 110 and 112 include anti-ice systems, ice prevention systems, deicing devices and systems, and/or the like.

The first icing detector 104 includes one or more probes, sensors, or the like that are configured to detect a first icing condition. In at least one example, the first icing detector 104 is an icing conditions detector that is configured to detect both ice water content and liquid water content. While such an icing conditions detector is configured to detect ice water content and liquid water content, the icing conditions detector may not be able to differentiate between ice water content and liquid water content.

The second icing detector 106 includes one or more probes, sensors, or the like that are configured to detect a second icing condition, which may differ from the first icing condition. In at least one example, the second icing detector 106 is an accretion based ice detector, such as a magnetostrictive ice detector, which can detect liquid water content, but not ice water content. Ice accretion on a magnetostrictive ice detector builds and sheds in cycles. Typically, when a magnetostrictive ice detector is used, an engine anti-ice operation is performed before a wing anti-ice operation.

As noted, the control unit 108 is in communication with one or more deicers that are configured to deice one or more portions of the aircraft 102. For example, the first deicer 110 is configured to deice one or more first portions of the aircraft 102. The first deicer 110 is, or is part of, an ice protection system. In at least one example, the first deicer 110 is configured to deice one or more portions of an engine of the aircraft 102. The first deicer 110 can include one or more heaters, heating coils, heating mats, pneumatic heaters, hot air blowers, and/or the like.

The second deicer 112 is configured to deicer one or more second portions of the aircraft 102. The second deicer 112 is or is part of an ice protection system. In at least one example, the second deicer 112 is configured to deice one or more portions of a wing of the aircraft 102. The second deicer 112 can include one or more heaters, heating coils, heating mats, pneumatic heaters, hot air blowers, and/or the like.

Optionally, the first deicer 110 is configured to deice or more portions of a wing of the aircraft 102, and the second deicer 112 is configured to deice or more portions of the engine of the aircraft 102. Also, optionally, the control unit 108 can be in communication with more or less deicers than shown. For example, the control unit 108 can be in communication with only the first deicer 110 or the second deicer 112. As another example, the control unit 108 can be in communication with three or more deicers, each of which is configured to deice a different portion of the aircraft 102.

As noted, the user interface 114 can be part of a computer workstation, a flight computer, and/or the like within the aircraft 102. The user interface 114 includes a display 116, such as an electronic monitor, screen, television, or the like, and a speaker 118 (for example, an audio speaker, loudspeaker, and/or the like). Optionally, the user interface 114 may include only one of the display 116 or the speaker 118.

In operation, the first icing detector 104 is configured to detect the first icing condition and the second icing detector 106 is configured to detect the second icing condition. In response to detecting the first icing condition, the first icing detector 104 outputs a first icing signal 120 indicative of the first icing condition. Similarly, in response to detecting the second icing condition, the second icing detector 106 outputs a second icing signal 122 indicative of the second icing condition. The control unit 108 receives the first icing signal 120 and the second icing signal 122 from the first icing detector 104 and the second icing detector 106, respectively.

As described herein, the control unit 108 differentiates between presence of liquid water content (such as supercooled liquid water) and ice crystal formation (for example, ice crystal icing) based on receiving one or both of the first icing signal 120 and the second icing signal 122. In at least one example, in response, the control unit 108 operates the first deicer 110 and the second deicer 112 in response to receiving one or both of the first icing signal 120 and/or the second icing signal 122. In at least one example, the control unit 108 also outputs one or more information signals 124 to the user interface 114. The information signals 124 are indicative of information based on the icing conditions. Such information can be shown on the display 116 and/or broadcast through the speaker 118. Optionally, the control unit 108 can differentiate between icing conditions but not automatically operate one or more deicers in response thereto.

In response to the control unit 108 receiving the first icing signal 120 indicative of the first icing condition from the first icing detector 104 (such as an icing conditions detector that is configured to detect both ice water content and liquid water content), and the second icing signal 122 indicative of the second icing condition from the second icing detector 106 (such as a magnetostrictive ice detector that is only able to detect liquid water content), the control unit 108 determines the presence of supercooled liquid water and potentially ice crystals on one or more surfaces of the aircraft 102. Accordingly, the control unit 108 can then automatically operate the first deicer 110, such as to remove ice from one or more portions of an engine, and the second deicer 112, such as to remove ice from one or more surfaces of a wing. In this manner, the system 100 reduces overuse (and therefore energy consumption) of the deicers, as both the first icing signal 120 and the second icing signal 122 are received in order to activate both the first deicer 110 and the second deicer 112. The control unit 108 can further output one or more information signals 124 indicating potential for ice building on edges of windscreens and wiper blades, which can be shown on the display 116 and/or broadcast via the speaker 118.

In at least one example, in response to the receiving both the first icing signal 120 and the second icing signal 122, the control unit 108 automatically operates the first deicer 110 to remove, prevent, and/or otherwise reduce icing in relation to an engine of the aircraft 102. The control unit 108 can then activate the second deicer 112 based on the cycles of the first deicer 110. As a non-limiting example, the first deicer 110 can be activated after two detection cycles, and the second deicer 112 can be activated after eight additional detection cycles. In other examples, the first deicer 120 can be activated in fewer or more than two detections cycles, and the second deicer 112 can be activated in fewer or more than eight additional detection cycles.

In response to the control unit 108 receiving the first icing signal 120 indicative of the first icing condition, but not the second icing signal 122 indicative of the second icing condition (that is, the control unit 108 only receives the first icing signal 120), the control unit 108 determines the presence of ice crystals. For example, if liquid water content was present, then the control unit 108 would also receive the second icing signal 122 from the second icing detector 106. Because the first icing detector 104 is able to detect both ice water content and liquid water content, reception of the first icing signal 120 indicative of the first icing condition necessarily means that ice water content is present, but not liquid water content. In this manner, the control unit 108 can differentiate between ice water content and liquid water content through analysis of the first icing signal 120 and the second icing signal 122. In particular, if both the first icing signal 120 and the second icing signal 122 are received, the control unit 108 determines that both supercooled liquid water content and potentially ice crystals are present on one or more portions of the aircraft 102. If, however, only the first icing signal 120 is received, but not the second icing signal 122, the control unit 108 determines that ice crystals are present on or more portions of the aircraft 102. In either scenario, the control unit 108 automatically operates one or both of the first deicer 110 or the second deicer 112 to remove, prevent, or otherwise reduce potential ice formation on one or more portions of the aircraft 102. The control unit 108 can further output the one or more information signals 124 to the user interface 114, in order to display and/or broadcast information regarding activation of the one or more deicers, for example. The information signals 124 can also include information regarding effects in relation to various portions of the aircraft 102.

In response to the control unit 108 receiving the second icing signal 122 from the second icing detector 106, but not the first icing signal 120 from the first icing detector 104, the control unit 108 determines an error condition, which may require maintenance. For example, the first icing detector 104 is configured to detect both ice water content and liquid water content, while the second icing detector 106 is configured to detect only liquid water content. By receiving the second icing signal 122 from the second icing detector indicating the presence of liquid water content, but not the first icing signal 120 which would otherwise also detect the presence of liquid water content, the control unit 108 determines a malfunction of one or both of the first icing detector 104 and/or the second icing detector 106. In response, the control unit 108 outputs the one or more information signals 124 which include an alert message indicating the potential of an error.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation, as described herein.

The control unit 108 is configured to execute a set of instructions that are stored in one or more data storage units or elements (such as one or more memories), in order to process data. For example, the control unit 108 may include or be coupled to one or more memories. The data storage units may also store data or other information as desired or needed. The data storage units may be in the form of an information source or a physical memory element within a processing machine.

The set of instructions may include various commands that instruct the control unit 108 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
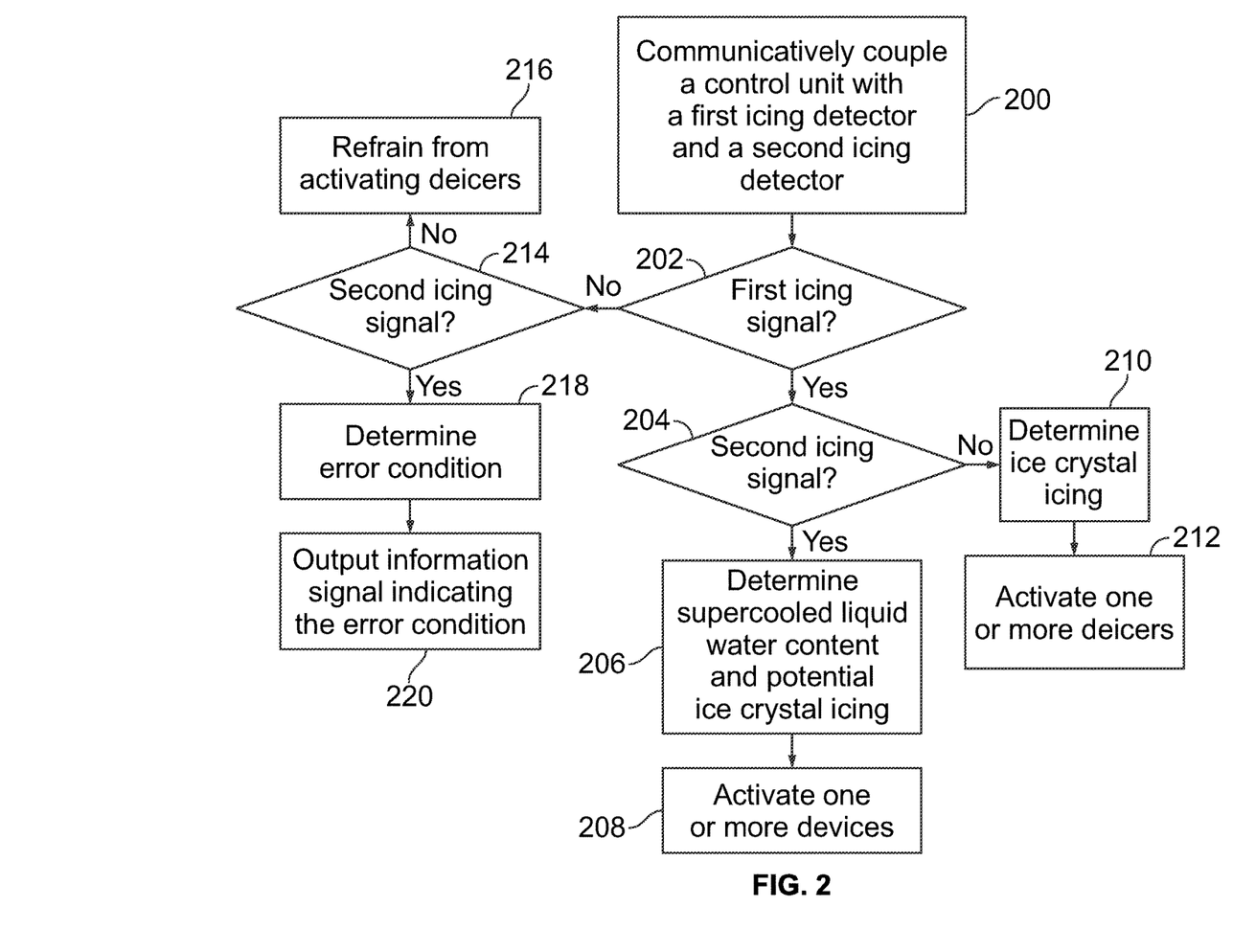
FIG. 2 illustrates a flow chart of a method for deicing one or more portions of an aircraft, according to an example of the present disclosure.

FIG. 2 illustrates a flow chart of a method for deicing one or more portions of an aircraft, according to an example of the present disclosure. Referring to FIGS. 1 and 2, at 200, the control unit 108 is communicatively coupled to the first icing detector 104 and the second icing detector 106. At 202, the control unit 108 determines if the first icing signal 120 indicative of the first icing condition is received. If the first icing signal 120 is received at 202, the control unit 108 next determines at 204 if the second icing signal 122 indicative of the second icing condition is received. If the second icing signal is also received at 204, the method proceeds to 206, at which the control unit 108 determines that supercooled liquid water content and potential ice crystal icing is present on one or more surfaces of the aircraft 102. At 208, the control unit 108 then activates one or more deicers, such as the first deicer 110 and/or the second deicer 112, in response thereto. Optionally and/or additionally, at 208, instead of deicers being activated, the control unit 108 can trigger an internal engine function, such as raising idle speed.

If, however, the second icing signal 122 is not detected at 204, the method proceeds to 210, at which the control unit 108 determines the presence of ice crystal icing. At 212, the control unit 108 then activates the one or more deicers, such as the first deicer 110 and/or the second deicer 112, in response thereto. Optionally and/or additionally, at 212, instead of deicers being activated, the control unit 108 can trigger an internal engine function, such as raising idle speed.

If, however, the first icing signal 120 is not received at 202, the method proceeds to 214, at which the control unit 108 determines if the second icing signal 122 has been received. If the first icing signal 120 is not received at 202 and the second icing signal 122 is not received at 214, the control unit 108 determines that no icing conditions are present, and refrains from activating the deicers at 216.

If, however, the first icing signal 120 is not received at 202, but the second icing signal 122 is received at 214, the control unit 108 determines an error condition at 218. The error condition may be a scenario that requires maintenance, such as to check and potentially repair one or both of the ice detectors 104 and 106. Accordingly, the method may then proceed from 218 to 220, at which the control unit 108 outputs an information signal 124 indicating the error condition to the user interface 114. The error condition can be shown on the display 116 and/or broadcast through the speaker 118.

The method can also include message to individuals, such as pilots, regarding the operations described herein. The messages can be shown on a display and/or broadcast through a speaker.

Figure 3:
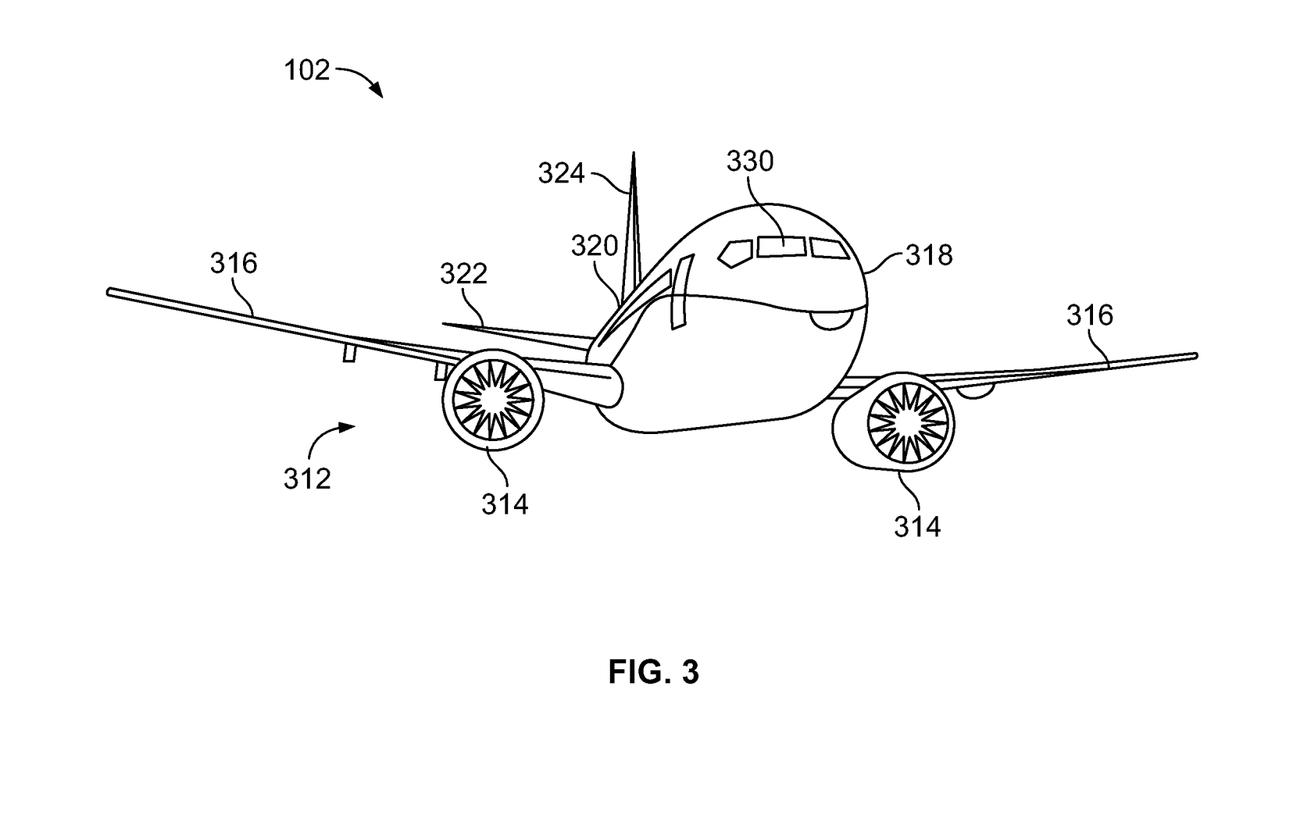
FIG. 3 illustrates a perspective front view of the aircraft, according to an example of the present disclosure.

FIG. 3 illustrates a perspective front view of the aircraft 102, according to an example of the present disclosure. The aircraft 102 includes a propulsion system 312 that includes engines 314, for example. In at least one example, one or more first deicers 110 (shown in FIG. 1) are operatively coupled to one or more of the engines 314. Optionally, the propulsion system 312 may include more engines 314 than shown. The engines 314 are carried by wings 316 of the aircraft 102. In at least one example, one or more second deicers 112 (shown in FIG. 1) are operatively coupled to one or both of the wings 316.

In other embodiments, the engines 314 may be carried by a fuselage 318 and/or an empennage 320. The empennage 320 may also support horizontal stabilizers 322 and a vertical stabilizer 324. The fuselage 318 of the aircraft 102 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. The user interface 114 shown in FIG. 1 is within the internal cabin 330, such as within the flight deck.

FIG. 3 shows an example of an aircraft 102. It is to be understood that the aircraft 102 can be sized, shaped, and configured differently than shown in FIG. 3.

Figure 4:
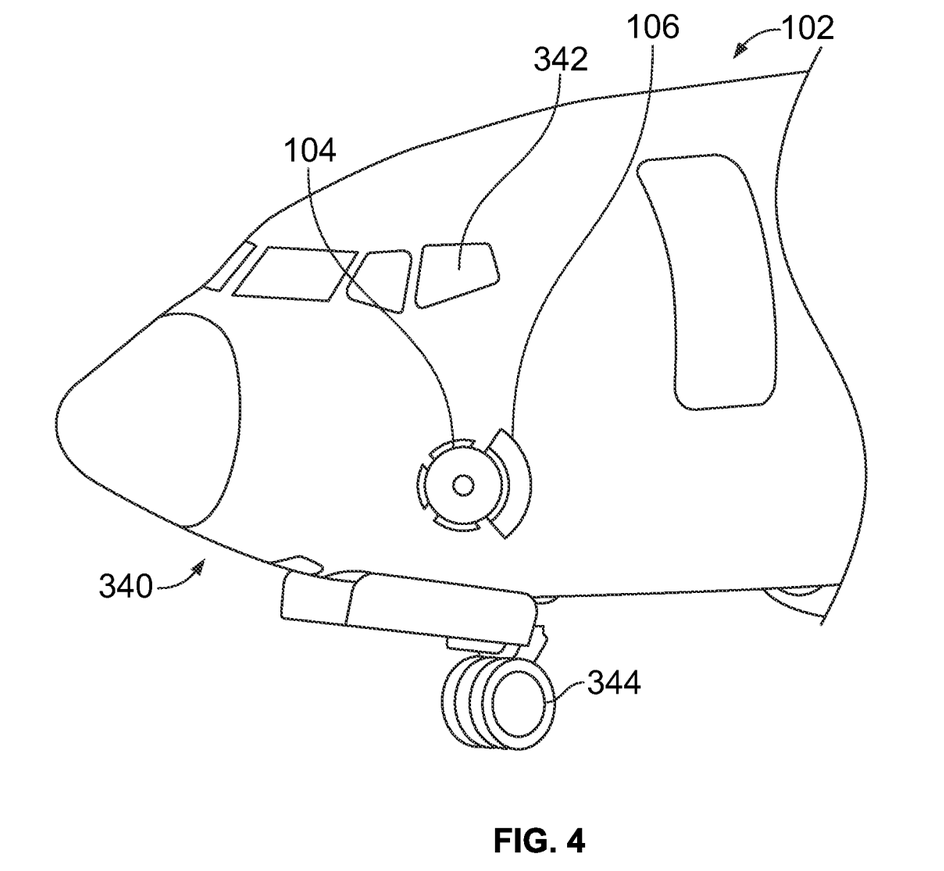
FIG. 4 illustrates a perspective lateral view of a nose of the aircraft, according to an example of the present disclosure.

FIG. 4 illustrates a perspective lateral view of a nose 340 of the aircraft 102, according to an example of the present disclosure. The first icing detector 104 and the second icing detector 106 can be located proximate to the nose 340. For example, the first icing detector 104 and the second icing detector 106 can be disposed below a window 342 of the flight deck and above a front landing gear 344. The first icing detector 104 and the second icing detector 106 can be on the same side of the aircraft 102. Optionally, the first icing detector 104 can be on a first side of the aircraft 102, and the second icing detector 106 can be on a second side of the aircraft 102. Optionally, the first icing detector 104 and the second icing detector 106 can be at various other locations of the aircraft 102, such as on a top of the fuselage, on one or more engines, one or more wings, and/or the like.

Further, the disclosure comprises examples according to the following clauses:

Clause 1. A system comprising:
 a first icing detector configured to detect a first icing condition in relation to one or more portions of an aircraft, wherein the first icing detector is configured to output a first icing signal indicative of the first icing condition;

a second icing detector configured to detect a second icing condition in relation to the one or more portions of the aircraft, wherein the second icing detector is configured to output a second icing signal indicative of the second icing condition; and a control unit in communication with the first icing detector and the second icing detector, wherein the control unit is configured to receive the first icing signal from the first icing detector and the second icing signal from the second icing detector, and wherein the control unit is further configured to distinguish between presence of supercooled liquid water and ice crystal icing in response to receiving one or both of the first icing signal or the second icing signal.

Clause 2. The system of Clause 1, wherein the first icing detector is an icing conditions detector configured to detect both ice water content and liquid water content, and wherein the second icing detector is a magnetostrictive ice detector configured to detect the liquid water content.

Clause 3. The system of Clause 2, wherein the icing conditions detector is unable to differentiate between the ice water content and the liquid water content, and wherein the magnetostrictive ice detector is unable to detect the ice water content.

Clause 4. The system of any of Clauses 1-3, further comprising one or more deicers in communication with the control unit, wherein the one or more deicers are configured to deice the one or more portions of the aircraft.

Clause 5. The system of Clause 4, wherein the control unit is further configured to automatically operate the one or more deicers in response to receiving one or both of the first icing signal or the second icing signal.

Clause 6. The system of Clauses 4 or 5, wherein the one or more deicers comprise:
a first deicer configured to deice a first portion of the aircraft; and
a second deicer configured to deice a second portion of the aircraft.

Clause 7. The system of Clause 6, wherein the first portion of the aircraft comprises one or more portions of an engine or a wing, and wherein the second portion of the aircraft comprises one or more portion of the other of the engine or the wing.

Clause 8. The system of any of Clauses 1-7, further comprising a user interface having one or both of a display or a speaker, wherein, based on the icing conditions, the control unit is further configured to one or both of show information on the display or broadcast the information from the speaker.

Clause 9. The system of any of Clauses 1-8, wherein the control unit is configured to determine the presence of the supercooled liquid water and potentially the ice crystal icing in response to receiving both the first icing signal and the second icing signal.

Clause 10. The system of any of Clauses 1-9, wherein the control unit is configured to determine the presence of the ice crystal icing in response to receiving the first icing signal but not the second icing signal.

Clause 11. The system of any of Clauses 1-10, wherein the control unit is configured to determine an error condition in response to receiving the second icing signal but not the first icing signal.

Clause 12. A method comprising:
communicatively coupling a control unit with a first icing detector, wherein the first icing detector is configured to detect a first icing condition in relation to one or more portions of an aircraft, and wherein the first icing detector is configured to output a first icing signal indicative of the first icing condition;
communicatively coupling the control unit with a second icing detector, wherein the second icing detector is configured to detect a second icing condition in relation to the one or more portions of the aircraft, wherein the second icing detector is configured to output a second icing signal indicative of the second icing condition;
receiving, by the control unit, one or both of the first icing signal from the first icing detector and the second icing signal from the second icing detector; and
distinguishing, by the control unit, between presence of supercooled liquid water and ice crystal icing in response to receiving one or both of the first icing signal or the second icing signal.

Clause 13. The method of Clause 12, wherein the first icing detector is an icing conditions detector configured to detect both ice water content and liquid water content, wherein the icing conditions detector is unable to differentiate between the ice water content and the liquid water content, wherein the second icing detector is a magnetostrictive ice detector configured to detect the liquid water content, and wherein the magnetostrictive ice detector is unable to detect the ice water content.

Clause 14. The method of Clauses 12 or 13, further comprising operating one or more deicers to deice the one or more portions of the aircraft.

Clause 15. The method of Clause 14, wherein said operating comprises automatically operating, by the control unit, the one or more deicers in response to receiving one or both of the first icing signal or the second icing signal.

Clause 16. The method of Clause 15, wherein the one or more deicers comprise:
a first deicer configured to deice a one or more portions of an engine or a wing of the aircraft; and
a second deicer configured to deice one or more portion of the other of the engine or the wing of the aircraft.

Clause 17. The method of any of Clauses 12-16, wherein said distinguishing comprises determining the presence of the supercooled liquid water and potentially the ice crystal icing in response to receiving both the first icing signal and the second icing signal.

Clause 18. The method of any of Clauses 12-17, wherein said distinguishing comprises determining the presence of the ice crystal icing in response to receiving the first icing signal but not the second icing signal.

Clause 19. The method of any of Clauses 12-18, wherein said distinguishing comprises determining an error condition in response to receiving the second icing signal but not the first icing signal.

Clause 20. An aircraft comprising:
a first icing detector configured to detect a first icing condition in relation to one or more portions of the aircraft, wherein the first icing detector is configured to output a first icing signal indicative of the first icing condition;
a second icing detector configured to detect a second icing condition in relation to the one or more portions of the aircraft, wherein the second icing detector is configured to output a second icing signal indicative of the second icing condition;

a control unit in communication with the first icing detector and the second icing detector, wherein the control unit is configured to:
receive the first icing signal from the first icing detector and the second icing signal from the second icing detector,
distinguish between presence of supercooled liquid water and ice crystal icing in response to receiving one or both of the first icing signal or the second icing signal,
determine the presence of the supercooled liquid water and potentially the ice crystal icing in response to receiving both the first icing signal and the second icing signal,
determine the presence of the ice crystal icing in response to receiving the first icing signal but not the second icing signal, and
determine an error condition in response to receiving the second icing signal but not the first icing signal;
one or more deicers in communication with the control unit, wherein the one or more deicers are configured to deice the one or more portions of the aircraft, wherein the control unit is further configured to automatically operate the one or more deicers in response to receiving one or both of the first icing signal or the second icing signal; and
a user interface having one or both of a display or a speaker, wherein, based on the icing conditions, the control unit is further configured to one or both of show information on the display or broadcast the information from the speaker.

As described herein, examples of the present disclosure provide systems and methods that are able to distinguish between different types of icing conditions, such as supercooled water and ice crystals. Further, examples of the present disclosure provide systems and methods for detecting icing in various forms and operating deicers in response thereto.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a first icing detector configured to detect a first icing condition in relation to one or more portions of an aircraft, wherein the first icing detector is an icing conditions detector configured to detect both ice water content and liquid water content, and wherein the first icing detector is configured to output a first icing signal indicative of the first icing condition;
a second icing detector configured to detect a second icing condition in relation to the one or more portions of the aircraft, wherein the second icing detector is a magnetostrictive ice detector configured to detect the liquid water content, wherein the second icing detector is located aft in relation to the first icing detector, and wherein the second icing detector is configured to output a second icing signal indicative of the second icing condition; and
a control unit in communication with the first icing detector and the second icing detector, wherein the control unit is configured to receive the first icing signal from the first icing detector and the second icing signal from the second icing detector, and wherein the control unit is further configured to distinguish, independent of water drop size or temperature, between a presence of supercooled liquid water and ice crystal icing in response to receiving one or both of the first icing signal or the second icing signal.

2. The system of claim 1, wherein the icing conditions detector is unable to differentiate between the ice water content and the liquid water content, and wherein the magnetostrictive ice detector is unable to detect the ice water content.

3. The system of claim 1, further comprising one or more deicers in communication with the control unit, wherein the one or more deicers are configured to deice the one or more portions of the aircraft.

4. The system of claim 3, wherein the control unit is further configured to automatically operate the one or more deicers in response to receiving one or both of the first icing signal or the second icing signal.

5. The system of claim 3, wherein the one or more deicers comprise:
a first deicer configured to deice a first portion of the aircraft, wherein the control unit is further configured to automatically activate the first deicer after two detection cycles; and
a second deicer configured to deice a second portion of the aircraft, wherein the control unit is further configured to automatically activate the second deicer after eight additional detection cycles.

6. The system of claim 5, wherein the first portion of the aircraft comprises one or more portions of an engine or a wing, and wherein the second portion of the aircraft comprises one or more portion of the other of the engine or the wing.

7. The system of claim 1, further comprising a user interface having one or both of a display or a speaker, wherein, based on the icing conditions, the control unit is further configured to one or both of show information on the display or broadcast the information from the speaker.

8. The system of claim 1, wherein the control unit is configured to determine the presence of the supercooled liquid water and the ice crystal icing in response to receiving both the first icing signal and the second icing signal.

9. The system of claim 1, wherein the control unit is configured to determine the presence of the ice crystal icing in response to receiving the first icing signal but not the second icing signal.

10. The system of claim 1, wherein the control unit is configured to determine an error condition in response to receiving the second icing signal but not the first icing signal.

11. The system of claim 1, wherein the first icing detector is proximate to a nose of the aircraft below a window and above a front landing gear, and wherein the second icing detector is proximate to the nose of the aircraft below the window and above the front landing gear.

12. A method comprising:
communicatively coupling a control unit with a first icing detector, wherein the first icing detector is an icing conditions detector configured to detect both ice water content and liquid water content, wherein the icing conditions detector is unable to differentiate between the ice water content and the liquid water content, wherein the first icing detector is configured to detect a first icing condition in relation to one or more portions of an aircraft, and wherein the first icing detector is configured to output a first icing signal indicative of the first icing condition;
communicatively coupling the control unit with a second icing detector, wherein the second icing detector is configured to detect a second icing condition in relation to the one or more portions of the aircraft, wherein the second icing detector is a magnetostrictive ice detector configured to detect the liquid water content, and wherein the magnetostrictive ice detector is unable to detect the ice water content, wherein the second icing detector is located aft in relation to the first icing detector, and wherein the second icing detector is configured to output a second icing signal indicative of the second icing condition;
receiving, by the control unit, one or both of the first icing signal from the first icing detector and the second icing signal from the second icing detector; and
distinguishing, by the control unit, independent of water drop size or temperature, between a presence of supercooled liquid water and ice crystal icing in response to receiving one or both of the first icing signal or the second icing signal.

13. The method of claim 12, further comprising operating one or more deicers to deice the one or more portions of the aircraft.

14. The method of claim 13, wherein said operating comprises automatically operating, by the control unit, the one or more deicers in response to receiving one or both of the first icing signal or the second icing signal.

15. The method of claim 14, wherein the one or more deicers comprise:
a first deicer configured to deice a one or more portions of an engine or a wing of the aircraft, wherein the control unit is configured to automatically activate the first deicer after two detection cycles; and
a second deicer configured to deice one or more portion of the other of the engine or the wing of the aircraft, wherein the control unit is further configured to automatically activate the second deicer after eight additional detection cycles.

16. The method of claim 12, wherein said distinguishing comprises determining the presence of the supercooled liquid water and the ice crystal icing in response to receiving both the first icing signal and the second icing signal.

17. The method of claim 12, wherein said distinguishing comprises determining the presence of the ice crystal icing in response to receiving the first icing signal but not the second icing signal.

18. The method of claim 12, wherein said distinguishing comprises determining an error condition in response to receiving the second icing signal but not the first icing signal.

19. The method of claim 12, wherein the first icing detector is proximate to a nose of the aircraft below a window and above a front landing gear, and wherein the second icing detector is proximate to the nose of the aircraft below the window and above the front landing gear.

20. An aircraft comprising:
a first icing detector configured to detect a first icing condition in relation to one or more portions of the aircraft, wherein the first icing detector is configured to output a first icing signal indicative of the first icing condition, and wherein the first icing detector is proximate to a nose of the aircraft below a window and above a front landing gear;
a second icing detector configured to detect a second icing condition in relation to the one or more portions of the aircraft, wherein the second icing detector is configured to output a second icing signal indicative of the second icing condition, wherein the second icing detector is proximate to the nose of the aircraft below the window and above the front landing gear, and wherein the second icing detector is located aft in relation to the first icing detector;
a control unit in communication with the first icing detector and the second icing detector, wherein the control unit is configured to:
receive the first icing signal from the first icing detector and the second icing signal from the second icing detector,
distinguish between a presence of supercooled liquid water and ice crystal icing in response to receiving one or both of the first icing signal or the second icing signal, determine the presence of the supercooled liquid water and the ice crystal icing in response to receiving both the first icing signal and the second icing signal, determine the presence of the ice crystal icing in response to receiving the first icing signal but not the second icing signal, and determine an error condition in response to receiving the second icing signal but not the first icing signal;

one or more deicers in communication with the control unit, wherein the one or more deicers are configured to deice the one or more portions of the aircraft, wherein the control unit is further configured to automatically operate the one or more deicers in response to receiving one or both of the first icing signal or the second icing signal; and a user interface having one or both of a display or a speaker, wherein, based on the icing conditions, the control unit is further configured to one or both of show information on the display or broadcast the information from the speaker.

21. A system comprising:

a first icing detector configured to detect a first icing condition in relation to one or more portions of an aircraft, wherein the first icing detector is proximate to a nose of the aircraft below a window and above a front landing gear, and wherein the first icing detector is configured to output a first icing signal indicative of the first icing condition;

a second icing detector configured to detect a second icing condition in relation to the one or more portions of the aircraft, wherein the second icing detector is proximate to the nose of the aircraft below the window and above the front landing gear, wherein the second icing detector is located aft in relation to the first icing detector, and wherein the second icing detector is configured to output a second icing signal indicative of the second icing condition; and a control unit in communication with the first icing detector and the second icing detector, wherein the control unit is configured to receive the first icing signal from the first icing detector and the second icing signal from the second icing detector, wherein the control unit is further configured to distinguish, independent of water drop size or temperature, between a presence of supercooled liquid water and ice crystal icing in response to receiving one or both of the first icing signal or the second icing signal, and wherein the control unit is configured to determine the presence of the ice crystal icing in response to receiving the first icing signal but not the second icing signal.

22. A system comprising:

a first icing detector configured to detect a first icing condition in relation to one or more portions of an aircraft, wherein the first icing detector is proximate to a nose of the aircraft below a window and above a front landing gear, and wherein the first icing detector is configured to output a first icing signal indicative of the first icing condition;

a second icing detector configured to detect a second icing condition in relation to the one or more portions of the aircraft, wherein the second icing detector is proximate to the nose of the aircraft below the window and above the front landing gear, wherein the second icing detector is located aft in relation to the first icing detector, and wherein the second icing detector is configured to output a second icing signal indicative of the second icing condition; and a control unit in communication with the first icing detector and the second icing detector, wherein the control unit is configured to receive the first icing signal from the first icing detector and the second icing signal from the second icing detector, wherein the control unit is further configured to distinguish, independent of water drop size or temperature, between a presence of supercooled liquid water and ice crystal icing in response to receiving one or both of the first icing signal or the second icing signal, and wherein the control unit is configured to determine an error condition in response to receiving the second icing signal but not the first icing signal.

23. A method comprising:

communicatively coupling a control unit with a first icing detector, wherein the first icing detector is configured to detect a first icing condition in relation to one or more portions of an aircraft, wherein the first icing detector is proximate to a nose of the aircraft below a window and above a front landing gear, and wherein the first icing detector is configured to output a first icing signal indicative of the first icing condition;

communicatively coupling the control unit with a second icing detector, wherein the second icing detector is configured to detect a second icing condition in relation to the one or more portions of the aircraft, wherein the second icing detector is proximate to the nose of the aircraft below the window and above the front landing gear, wherein the second icing detector is located aft in relation to the first icing detector, and wherein the second icing detector is configured to output a second icing signal indicative of the second icing condition;

receiving, by the control unit, one or both of the first icing signal from the first icing detector and the second icing signal from the second icing detector; and distinguishing, by the control unit, independent of water drop size or temperature, between a presence of supercooled liquid water and ice crystal icing in response to receiving one or both of the first icing signal or the second icing signal, wherein said distinguishing comprises determining the presence of the ice crystal icing in response to receiving the first icing signal but not the second icing signal.

24. A method comprising:

communicatively coupling a control unit with a first icing detector, wherein the first icing detector is configured to detect a first icing condition in relation to one or more portions of an aircraft, wherein the first icing detector is proximate to a nose of the aircraft below a window and above a front landing gear, and wherein the first icing detector is configured to output a first icing signal indicative of the first icing condition;

communicatively coupling the control unit with a second icing detector, wherein the second icing detector is configured to detect a second icing condition in relation to the one or more portions of the aircraft, wherein the second icing detector is proximate to the nose of the aircraft below the window and above the front landing gear, wherein the second icing detector is located aft in relation to the first icing detector, and wherein the second icing detector is configured to output a second icing signal indicative of the second icing condition;

receiving, by the control unit, one or both of the first icing signal from the first icing detector and the second icing signal from the second icing detector; and distinguishing, by the control unit, independent of water drop size or temperature, between a presence of supercooled liquid water and ice crystal icing in response to receiving one or both of the first icing signal or the second icing signal, wherein said distinguishing comprises determining an error condition in response to receiving the second icing signal but not the first icing signal.

* * * * *